March 25, 1969

H. G. AAS ET AL 3,435,372

ULTRASONIC MODULATOR HAVING A CYLINDRICAL TRANSDUCER

Filed Jan. 19, 1966

INVENTORS
HERBERT G. AAS
GEORGE EDWARD DANIELSON, JR.

BY Donald J. Bradley
ATTORNEY

United States Patent Office 3,435,372
Patented Mar. 25, 1969

3,435,372
ULTRASONIC MODULATOR HAVING A
CYLINDRICAL TRANSDUCER
Herbert G. Asa, East Hartford, Conn., and George E. Danielson, Jr., Rochester, N.Y., assignors to United Aircraft Corporation, East Hartford, Conn., a corporation of Delaware
Filed Jan. 19, 1966, Ser. No. 521,658
Int. Cl. H01s 3/08
U.S. Cl 331—94.5    8 Claims This invention relates to the modulation or gating of lasers, and particularly to the internal gating of lasers with focused acoustic waves.

Amplitude modulating or gating the output of lasers to obtain repetitive pulses has many desirable applications in communications, space and military fields. One method of producing this type of laser modulation is described in copending U.S. application Ser. No. 487,181 filed Sept. 14, 1965, by A. J. De Maria entitled "Laser Modulation by Focused Acoustic Energy," and assigned to the same assignee. As described in the reference application, a tubular transducer is bonded directly onto a portion of a laser rod, and the transducer is driven to generate an ultrasonic wave which is focused within the laser rod. With the ultrasonic perturbation present, the laser output consists of a train of repetitive pulses synchronized to the ultrasonic frequency.

Although the method described in the referenced application produces favorable results, after a time the inner electrodes of the transducer are damaged by the flash lamp and by stray laser radiation. Problems in bonding the transducer to the laser rod also occur and tuning of the transducers must be performed after bonding. There is also difficulty in matching the impedance of the transducer with the impedance of the laser rod because no two transducers have identical mechanical bonds, thereby resulting in variations in the laser gating frequency.

This invention overcomes the disadvantages of the prior art by coupling the focused acoustic energy from the cylindrical transducer to the laser rod through a fluid or liquid medium contained in a cavity. By varying the relative concentrations of two fluids having different velocities, the desired sound velocity can be obtained to tune the cavity to resonance. The liquid coupling technique also eliminates all bonding and impedance matching problems.

Briefly, an ultrasonic cell comprising a tubular cylindrical transducer is placed around and concentric with the laser rod. The cell is filled with a suitable liquid, and the transducer is driven at the radial resonance frequency of the rod. The ultrasonic energy produced by the transducer is coupled through the liquid and focuses in the laser rod to produce a radial resonance in the laser rod. This radial standing wave spoils the "Q" of the laser optical cavity, and the laser energy is gated at a frequency directly proportional to the frequency of the standing wave.

It is, therefore, an object of this invention to produce a novel apparatus for modulating or gating the output of a laser.

Another object of this invention is a novel ultrasonic modulator or gate which couples ultrasonic energy through a fluid medium to produce a radial resonance in a laser rod.

A further object of this invention is a new and improved laser modulator or gate which gates the output of a laser without introducing lossy elements into the optical feedback path.

Another object of this invention is a laser modulator or gate which produces an increase in the output energy of the laser.

A still further object of this invention is a novel ultrasonic laser modulator or gate containing a two component fluid medium which may be tuned to resonance by varying the relative concentration of the fluids.

These and other objects and a better understanding of this invention may be had by referring to the following description and claims, read in conjunction with the accompanying drawings, in which:

Figure 1:
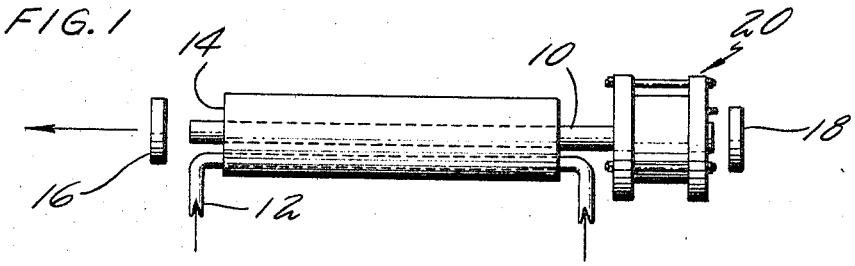
FIGURE 1 shows the ovel ultrasonic modulator apparatus attached to a laser rod within a cavity.

Referring to FIGURE 1 there is shown a typical embodiment of this invention. A $Nd^{3+}$ doped glass laser rod 10 and a flash lamp 12 are surrounded by a cylindrical element 14 of high reflectivity, the purpose of element 14 being to couple as much of the flash lamp energy as possible into the laser rod. A source of power (not shown) must be included to actuate flash lamp 12. The laser rod is contained in a cavity comprising external planar multi-dielectric coated end mirrors 16 and 18 to form the Fabry-Perot feedback cavity. A typical laser rod is Kodak Type ND–10. In experimental set-ups the rod was 17 inches long and ½ inch in diameter, with 12 inches of the rod pumped by the flash lamp.

Figure 2:
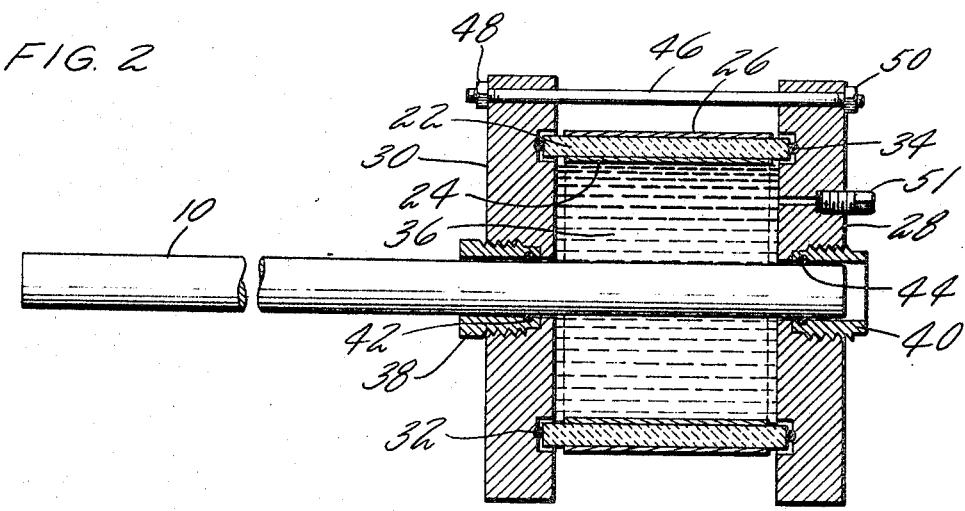
FIGURE 2 shows in detail the ultrasonic cell of FIGURE 1.

A focusing ultrasonic modulator assembly 20 is attached to one end of the rod 10 surrounding the rod. Referring to FIGURE 2, a cylindrical transducer 22 having an inner electrode 24 and an outer electrode 26 is mounted between two pressure tight end plates 28 and 30. A pair of O-rings 32 and 34 seal the chamber 36 formed by the transducer 22 and end plates 28 and 30. The rod 10 is held by quick disconnect fittings shown as sealing screws 38 and 40 which screw into end plates 30 and 28 respectively. Additional O-rings 42 and 44 seal the chamber 36 and acoustically decouple the laser rod 10 from the end plates. End plates 28 and 30 are held together by one or more mounting rods 46 with screw threads at the ends on which nuts 48 and 50 are screwed. The focusing ultrasonic modulator assembly 20 covers approximately 4 inches of laser rod 10.

The chamber 36 is filled through filler holes 51 with a suitable fluid such as water, alcohol, benzene, or carbon-tetrachloride, for example, to obtain the required sound velocity in the fluid. The chamber or cavity may be tuned to resonance by using a two component fluid, and varying the concentration of the fluids until the desired sound velocity is attained.

A high frequency oscillator, not shown, is connected to electrodes 24 and 26 to produce a voltage between the electrodes and cause the transducer 22 to oscillate. A high-Q ferroelectric transducer such as PZT-4 is the preferred transducer, although other types may be used. The ratio of the transducer diameter to wall thickness should usually be greate rthan 10 to operate in a pure thickness mode. The inner and outer transducer surfaces may be ground to adjust the transducer resonance to the desired radial mode of the laser rod and to reduce deviations in concentricity and thickness to the smallest possible tolerance.

When the transducer 22 is actuated by the oscillator at a suitable frequency, an ultrasonic standing wave is produced which is coupled through the liquid in cavity 36 and focuses in the laser rod 10 to produce a radial resonance therein. The laser rod 10 must be driven close to a pure radial mode for this type of ultrasonic drive or the probability is high that the laser will remain Q-spoiled throughout the pumping. The excitation of a pure radial mode in the laser rod will produce a relatively high change in the index of refraction because of the ultrasonic focusing effect, a fairly well defined stress distribution, and a lower probability of exciting unwanted acoustic modes. Only the odd radial modes produce internal stresses in the laser rod.

In practice, the maximum standing wave ratio will occur with the first pressure node in the liquid rather than at the face of the transducer because of phase shift caused by the internal damping of the transducer. This will cause the resonant frequency of the transducer in the system to be higher than it is in air. At resonance a pressure node will exit at the surface of the laser rod, and except for acoustical losses and dimensional imperfections, the displacement of the transducer will be transmitted through the fluid and increased by the focusing effect of the cylindrical geometry.

Cavitation of the liquid can be eliminated by pressurizing the cavity, and to the extent that shear flow in a liquid can be eliminated, there should be no turbulent streaming, since in a standing wave, streaming is a diffusion process.

Figure 3:
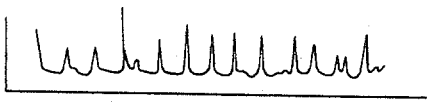
FIGURE 3 shows a typical laser oscillation without use of the ultrasonic cell.
Figure 4:
FIGURE 4 shows a typical laser oscillation with the ultrasonic cell.

In an experimental test setup with a $Nd^{3+}$ doped glass laser rod as described previously and using methylalcohol as the liquid, the liquid gave a radial resonance with the transducer coupling energy into the laser rod at 777 kc. When the laser was gated at this frequency the output consisted of a train of repetitive pulses whose frequency was the same as that of the ultrasonic wave and whose height followed the pumping lamp intensity. The output train emitted when the focusing, liquid-coupling ultrasonic modulator was in action during the lasing action is shown in FIGURE 4, and is a series of equally spaced, equal amplitude pulses. FIGURE 3 shows the irregular normal random output of the laser rod when the focusing, liquid-coupling ultrasonic modulator was not actuated. The laser was operated 15% above threshold.

When the frequency applied to the transducer is slightly off-resonance, e.g. 780 kc. rather than 777 kc., the laser output pulses are no longer uniform and regular as in FIGURE 4, but are of the random oscillating type chopped up at the applied frequency. The laser oscillations are quite sensitive to the radial mode resonance.

Figure 5:
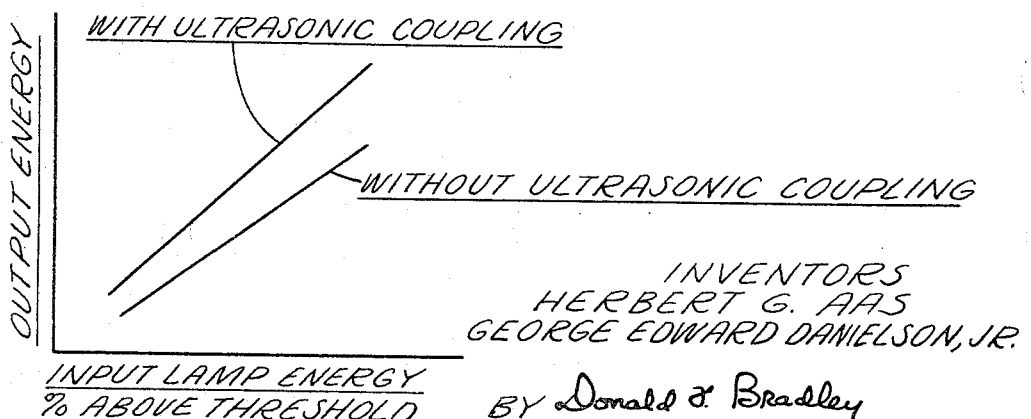
FIGURE 5 shows graphically the increase in laser output energy as a function of flash lamp input energy.

FIGURE 5 illustrates the increase in output laser energy as a function of flash lamp input energy with and without ultrasonic perturbation in the feedback cavity, thereby demonstrating that an increase in the output energy of a solid state laser can be obtained by using the disclosed modulating technique.

One advantage of this modulator is that it can be used with very high gain lasers where the length or gain is such that conventional methods of Q-spoiling lasers will not work. It also provides a way of Q-spoiling the optical cavity without introducing additional lossy elements. The liquid allows the modulator to be tuned, and the liquid also helps absorb damaging ultraviolet radiation and cool the laser surfaces while still allowing the laser output to be modulated. The bonding, tuning and deterioration problems of the prior art apparatus have also been eliminated.

A disadvantage of this modulator is that it masks off a portion of the laser rod from the pumping lamps, and therefore this method is most effective with four-level laser systems although it may be used with any laser. The glass laser rod described herein is a four-energy level system and will not absorb the laser radiation in the nonpumped portion of the laser rod.

The laser modulator described herein which generates a radially inward sonic wave focused in a laser medium will function as a time varying converging-diverging waveguide to modulate or gate a high gain laser's output at the acoustic frequency. The unique properties of this type of laser output control are an increased laser output by as much as 100%, lack of any mode structure in the laser's output, uniform pulse heights in the laser's output, repetitive output pulse trains at a controllable frequency, simplicity and reliability, and the elimination of lossy optical elements in the laser's feedback path.

Although this invention has been described in conjunction with a four-level glass laser, it is obvious that other lasers may be used, and that other changes may be made to the apparatus without departing from the invention as hereinafter claimed.

We claim:
1. Apparatus for modulating or gating the output of a laser comprising:
 a laser rod,
 a transducer,
 an acoustic medium interposed between said transducer and said laser rod,
 means for actuating said transducer to generate an acoustic wave, and
 focusing means for propagating said acoustic wave through said medium to focus said wave internally within said laser rod.

2. Apparatus for modulating the output of a laser as in claim 1 in which said medium is a fluid.

3. Apparatus for modulating the output of a laser as in claim 1 in which said medium comprises a two component fluid, each fluid component being of a density different from that of the other fluid.

4. Apparatus as in claim 1 in which said transducer comprises a cylindrical ferroelectric material concentrically surrounding said laser rod.

5. Apparatus as in claim 4 wherein said medium is liquid and wherein said liquid is enclosed in a closed chamber having said cylindrical ferroelectric transducer forming the outside wall of said chamber, and first and second end platse connected at the respective ends of said transducer to form the end walls of said chamber, said liquid being in contact with said laser rod.

6. Apparatus as in claim 5 in which said liquid chamber is pressurized.

7. Apparatus as in claim 6 and including first and second electrodes connected respectively to the inside and outside of said transducer.

8. Apparatus as in claim 5 in which the ratio of the diameter to the wall thickness of said transducer is at least ten to one.

References Cited

UNITED STATES PATENTS 3,247,386 4/1966 Vickery _____ 331—94.5
3,354,407 11/1967 Howling _____ 331—94.5

RONALD L. WIBERT, *Primary Examiner.*

U.S. Cl. X.R.
332—7.51